(12) United States Patent
Vengertsev et al.

(10) Patent No.: US 12,340,282 B2
(45) Date of Patent: Jun. 24, 2025

(54) ANOMALY DETECTION AND RESOLUTION

(71) Applicant: Micron Technology, Inc., Boise, ID (US)

(72) Inventors: Dmitry Vengertsev, Boise, ID (US); Zahra Hosseinimakarem, Boise, ID (US); Marta Egorova, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1153 days.

(21) Appl. No.: 17/083,768

(22) Filed: Oct. 29, 2020

(65) Prior Publication Data

US 2022/0138612 A1    May 5, 2022

(51) Int. Cl.
| | | |
|---|---|---|
| G06N 3/08 | (2023.01) | |
| G05B 19/4155 | (2006.01) | |
| G06F 16/28 | (2019.01) | |
| G06N 3/098 | (2023.01) | |
| G06N 20/00 | (2019.01) | |

(52) U.S. Cl.
CPC ......... *G06N 20/00* (2019.01); *G05B 19/4155* (2013.01); *G06F 16/285* (2019.01); *G06N 3/08* (2013.01); *G06N 3/098* (2023.01); *G05B 2219/42018* (2013.01)

(58) Field of Classification Search
CPC ............. G06N 3/08; G06N 3/098; G06N 3/09
See application file for complete search history.

(56) References Cited

U.S. PATENT DOCUMENTS

| | | |
|---|---|---|
| 9,875,502 B2 | 1/2018 | Kay |
| 10,209,711 B1 * | 2/2019 | Brazeau ............... G05D 1/0088 |
| 10,783,363 B2 | 9/2020 | Sohn |
| 10,788,836 B2 | 9/2020 | Afrouzi |
| 10,816,989 B2 | 10/2020 | Chen |

(Continued)

FOREIGN PATENT DOCUMENTS

| | | | |
|---|---|---|---|
| KR | 10-2020-0036677 A | 4/2020 | |
| KR | 10-2020-0084449 A | 7/2020 | |

OTHER PUBLICATIONS

Hisahara, Hiroshi, et al. "Human avoidance function for robotic vacuum cleaner through use of environmental sensors: Roomba® making way for humans." 2014 5th International Conference on Intelligent Systems, Modelling and Simulation. IEEE, 2014. (Year: 2014).*

(Continued)

*Primary Examiner* — Hal Schnee
(74) *Attorney, Agent, or Firm* — Brooks, Cameron & Huebsch, PLLC

(57) ABSTRACT

Methods, apparatuses, and systems associated with anomaly detection and resolution are described. Examples can include detecting, via a sensor of a robot, an object in a path of the robot while the robot is performing a task in an environment and classifying the object as an anomaly or a non-anomaly and the environment as anomalous or non-anomalous using a machine learning model. Examples can include proceeding with the task responsive to classification of the object as a non-anomaly and the environment as non-anomalous and resolving the anomaly or the anomalous environment and proceeding with the task responsive to classification of the object as an anomaly or the environment as anomalous.

20 Claims, 5 Drawing Sheets

(56) References Cited

U.S. PATENT DOCUMENTS

| | | | |
|---|---|---|---|
| 2017/0323179 A1* | 11/2017 | Vallespi-Gonzalez | G06V 20/58 |
| 2018/0199784 A1 | 7/2018 | Schnittman | |
| 2018/0210445 A1 | 7/2018 | Choi et al. | |
| 2019/0098035 A1* | 3/2019 | Periaswamy | G05B 19/0428 |
| 2019/0184571 A1 | 6/2019 | Hou | |
| 2019/0223679 A1 | 7/2019 | Schnittman | |
| 2019/0344428 A1* | 11/2019 | Park | B25J 19/023 |
| 2020/0023511 A1 | 1/2020 | Lee | |
| 2020/0097012 A1 | 3/2020 | Hong et al. | |
| 2020/0205629 A1 | 7/2020 | Hong et al. | |
| 2020/0217057 A1 | 7/2020 | Spiro | |
| 2020/0327433 A1* | 10/2020 | Geraci | G06N 5/04 |
| 2020/0401135 A1* | 12/2020 | Chen | G05D 1/0038 |
| 2021/0056412 A1* | 2/2021 | Jung | G06N 3/045 |
| 2021/0182556 A1* | 6/2021 | Klug | G06V 20/35 |
| 2021/0256318 A1* | 8/2021 | Iyer | G06F 18/22 |
| 2021/0366096 A1* | 11/2021 | Cunha | G06V 10/44 |
| 2023/0025252 A1* | 1/2023 | Erickson | G06N 3/045 |
| 2023/0164056 A1* | 5/2023 | Nguyen | H04L 43/50 709/224 |

OTHER PUBLICATIONS

Yang, Kai, et al. "Federated machine learning for intelligent IoT via reconfigurable intelligent surface." IEEE network 34.5 (2020): 16-22. (Year: 2020).*

Du, Zhaoyang, et al. "Federated learning for vehicular internet of things: Recent advances and open issues." IEEE Open Journal of the Computer Society 1 (2020): 45-61. (Year: 2020).*

International search Report and Written Opinion from related international application No. PCT/US2021/054096, dated Jan. 10, 2022, 13 pages.

* cited by examiner

ANOMALY DETECTION AND RESOLUTION

TECHNICAL FIELD

The present disclosure relates generally to apparatuses, non-transitory machine-readable media, and methods associated with anomaly detection and resolution.

BACKGROUND

A computing device is a mechanical or electrical device that transmits or modifies energy to perform or assist in the performance of human tasks. Examples include robots that can replicate certain human movements and functions (e.g., carry out a series of actions) automatically. As used herein, "automatically" can include an action performed with limited or no user input and/or with limited or no prompting. In some examples, robots can be guided by an external control device or the control may be embedded within.

Robots may accept electronic programming, process data or physical perceptions electronically, operate autonomously to some degree, move around, operate physical parts of itself or physical processes, sense and manipulate their environment, and exhibit intelligent behavior (e.g., behavior which mimics humans or other animals). Example robots include mobile robots such as cleaning robots (e.g., vacuuming robot, dusting robot, mopping robot, lawn mowing robot, etc.) and delivery robots (e.g., drones, package delivery robot, etc.), industrial robots, interactive robots, and modular robots, among others.

DETAILED DESCRIPTION

Figure 1:
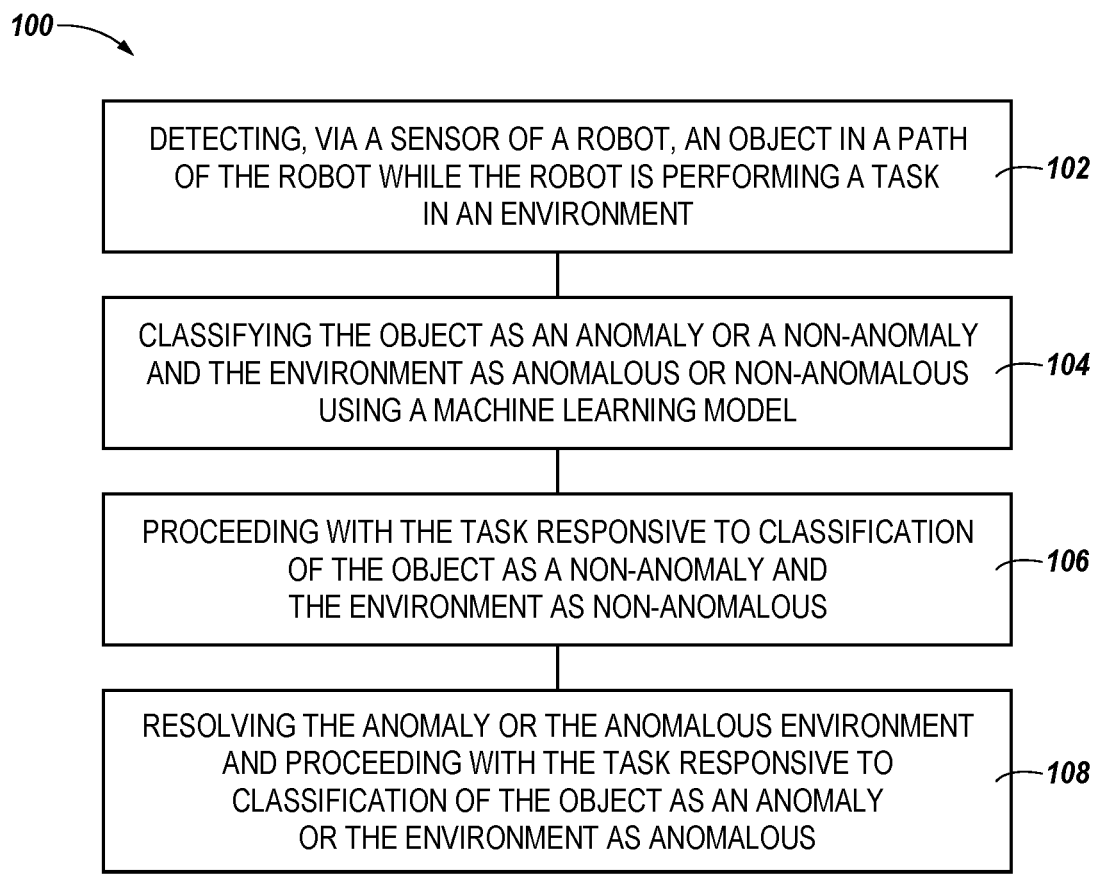
FIG. 1 is a flow diagram representing an example method for anomaly detection and resolution in accordance with a number of embodiments of the present disclosure.

Apparatuses, systems, and methods related to anomaly detection and resolution are described. Robots are used for several tasks including delivery and cleaning tasks. For instance, cleaning robots can clean items of a small enough size in their path and can move around large static items (e.g., a chair). However, these robots may not identify what the items are and may not detect moving items (e.g., a dog near a deliver robot). Examples of the present disclosure can improve effectiveness and performance of robots by allowing for anomaly detection and resolution. For instance, examples of the present disclosure can detect objects in a robot's path, as well as environmental factors, and classify them as anomalous or non-anomalous using machine learning models. Anomalies can be resolved, and the robot can continue performing its main task.

Examples of the present disclosure can include detecting, via a sensor of a robot, an object in a path of the robot while the robot is performing a task in an environment and classifying the object as an anomaly or a non-anomaly and the environment as anomalous or non-anomalous using a machine learning model. Such examples can include proceeding with the task responsive to classification of the object as a non-anomaly and the environment as non-anomalous and resolving the anomaly or the anomalous environment and proceeding with the task responsive to classification of the object as an anomaly or the environment as anomalous.

Other examples of the present disclosure can include an apparatus including a processing resource and a memory resource in communication with the processing resource having instructions executable to detect, via a sensor of the apparatus, an object in a path of the apparatus while the apparatus is performing a cleaning task in an environment. The instructions can also be executable to classify the object in the path of the apparatus as an anomaly or a non-anomaly and the environment as anomalous or non-anomalous using a machine learning model based on historical data associated with an object previously detected by the sensor and determine a response to the object in the path of the apparatus based on the classification and the machine learning model based on historical resolution data associated with the object previously detected by the sensor. The response can include instructions executable to remove the object in the path of the apparatus and proceed with the cleaning task responsive to classification of the object in the path of the apparatus as a non-anomaly and the environment as non-anomalous and resolve the anomaly or the anomalous environment and proceed with the cleaning task responsive to classification of the object in the path of the apparatus as an anomaly or the environment as anomalous.

Yet other examples of the present disclosure can include a system including a plurality of delivery robots communicatively coupled to one another. Each one of the plurality of delivery robots can include a processing resource and a memory resource in communication with the processing resource having instructions executable to detect, via a sensor, an object in a path of the delivery robot while the delivery robot is performing a delivery task in an environment. The instructions can be executable to classify the object as an anomaly or a non-anomaly and the environment as anomalous or non-anomalous using a machine learning model based on historical data associated with an object previously detected by the sensor and historical data received from other delivery robots of the plurality of delivery robots and determine a response to the object based on the classification and the machine learning model based on resolution data associated with the object previously detected by the sensor in the environment and historical data received from other delivery robots of the plurality of delivery robots.

In such examples, the response can include instructions executable to proceed with the delivery task responsive to classification of the object in the path of the delivery robot as a non-anomaly and the environment as non-anomalous, resolve the anomaly or the environment responsive to classification of the object in the path of the delivery robot as an anomaly or the environment as anomalous, and update the machine learning model based on the classification and determined response.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 448 can reference element "48" in FIG. 4, and a similar element can be referenced as 548 in FIG. 5. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Multiple analogous elements within one figure may be referenced with a reference numeral followed by a hyphen and another numeral or a letter. For example, 558-1 may reference element 58-1 in FIGS. 4 and 558-N may reference element 58-N, which can be analogous to element 58-1. Such analogous elements may be generally referenced without the hyphen and extra numeral or letter. For example, elements 558-1 and 558-N may be generally referenced as 558.

Some examples of the present disclosure include the use of sensors and machine learning models to improve functionality of robots, including cleaning and delivery robots. For instance, examples of the present disclosure can detect and resolve anomalies in a path of a robot (e.g., anomalous object, anomalous environment). As used herein, an anomaly can include something that deviates from what is standard, normal, or expected. An anomaly may be not easily classified or may deviate from a common rule, type, arrangement, or form. Detecting and resolving anomalies can increase performance and efficiency of robots, as well as user satisfaction in the robots.

For instance, using machine learning models, a robot in accordance with the present disclosure may learn that Object A is not normally in Environment B, and as a result, may detect Object A as an anomaly. The robot, using machine learning models, may determine how to resolve the anomaly (e.g., move it, dispose of it, etc.). Similar, the robot may detect an anomalous environment (e.g., attacking dog) and determine how to resolve it (e.g., retreat to safer location).

FIG. 1 is a flow diagram representing an example method 100 for anomaly detection and resolution in accordance with a number of embodiments of the present disclosure. The method 100 can be performed by a system or apparatus, such as the system 570 described with respect to FIG. 5 or the apparatus described with respect to FIG. 4.

At 102, the method 100 includes detecting, at a processing resource and via a sensor of a robot, an object in a path of the robot while the robot is performing a task in an environment. For instance, the robot can use an image sensor (e.g., a camera) or a pressure sensor, among other sensors, to receive image data, pressure data, etc. and use it to detect the object while performing a cleaning task in the environment or a delivery task in the environment, among other tasks. The data may include associated metadata that describes and provides information about the data (e.g., location, name of file, etc.). The environment can include the surroundings or conditions in which the robot operates. For example, the robot may detect a child's toy on a bathroom floor while it is performing a cleaning task using an image sensor (e.g., "seeing" the toy) or a pressure sensor (e.g., "feeling" the toy).

At 104, the method 100 includes classifying, at the processing resource, the object as an anomaly or a non-anomaly and the environment as anomalous or non-anomalous using a machine learning model. The machine learning model, which will be discussed further herein, can be based on a training data set provided to the robot, as well as data collected during previous tasks. In some examples, the metadata can be used during classification as a part of the machine learning model. For instance, classifying the object as an anomaly or the environment as anomalous can include, in some instances, determining, using the machine learning model, the object or the environment deviates from an object normally detected in the path or an environment normally associated with the task based on the received data and the previously received data. For example, the robot may have previously encountered a toy and/or previously encountered the bathroom environment. The machine learning model can use classifications that were made in previous encounters to determination a classification for a current object and environment. Using the machine learning model, it may be determined that the toy is a non-anomaly, but that water squirting from a sink in the bathroom suggests that the environment is anomalous. In some examples, anomalous may be any object that has not been previously identified, classified, and characterized in a table; or anomalous can be any object that has a threshold number of differences from previously identified objects.

The method 100, at 106, includes proceeding with the task responsive to processing resource's classification of the object as a non-anomaly and the environment as non-anomalous, and at 108, the method 100 includes resolving the anomaly or the anomalous environment and proceeding with the task responsive to the processing resource's classification of the object as an anomaly or the environment as anomalous. For example, an anomaly may be resolved prior to proceeding with the task in the following examples: object classified as an anomaly, environment classified as anomalous; object classified as a non-anomaly, environment classified as anomalous; and object classified as an anomaly, environment classified as non-anomalous. While three examples are given herein, other situations may be possible when an anomaly is resolved before proceeding with the task.

In an example where a robot detects dirt on a mudroom floor, it may be determined that neither the object (e.g., the dirt) nor the environment (e.g., mudroom) is anomalous, so the robot can proceed with its cleaning task (e.g., vacuuming) which may include cleaning the dirt. In contrast, in the toy example, the anomalous environment may be resolved by alerting a user of the squirting water (e.g., alarm, sending alert/message, etc.). Upon resolution of the squirting water, the robot may proceed with its task (e.g., vacuuming). If the toy was classified as a non-anomaly, the robot may move around it, but if the toy was classified as an anomaly, the robot may move it. For instance, resolving the anomaly can include the processing resource, the memory resource, or both, instructing the robot to move the object to a different location or the processing resource, the memory resource, or both communicating to a different robot (e.g., a processing resource of a different robot) to move the object to a different location.

The different location, in some instances, may include a set location to which anomalous objects are taken (or sent). For instance, in a warehouse, a box that has fallen on the floor may be classified as an anomaly, and a robot may move, or instruct another robot to move, the box to a predetermined location for further analysis or processing. In some instance, the different location is where the anomaly belongs (e.g., trash, proper shelf, child's room, etc.).

In some examples, the method 100 can include receiving at the processing resource, from the sensor, data about the task and the environment of the task while the robot is performing the task. For instance, as the robot is cleaning or delivering a product, the robot (e.g., at the processing resource, a memory resource coupled to the processing resource, or both), can receive image data, pressure data, temperature data, and other data depending on the sensor-type associated with the cleaning or delivering and the environment in which the cleaning or delivering is occurring.

The processing resource, memory resource coupled to the processing resource, or both, of the robot can learn about the task and the environment of the task via the machine learning model based on the received data, and the processing resource, the memory resource, or both can update the machine learning model based on the received data and data previously received from the sensor during previous task performances. In a delivery robot example, the robot may learn about the weather (e.g., raining, windy, sunny, etc.) in a particular city based on data received from sensors during a task and from previous tasks performances. The machine learning model can be updated accordingly. For instance, in Seattle, Washington, the machine learning model may learn that rain is common and not anomalous, while in Death Valley, California, a thunderstorm with torrential rain may be an anomaly to be resolved.

In some instances, the processing resource, the memory resource, or both can receive the machine learning model from a cloud-based service, augment the machine learning model with data collected while performing the task, and update the machine learning model while the robot is coupled to a charging station with collected data. For instance, a robot that is performing cleaning task may receive data via sensors while cleaning but perform little to no processing while performing the cleaning task. When the robot returns to its charging station, the received data is combined with other data associated with the machine learning model, and the machine learning model can be updated. This can allow for privacy protection, for instance, because the machine learning model is retrieved from the cloud-based service but retrained locally while the robot is charging, for instance using methods such as knowledge distillation and active learning, among others. This can prevent personal information from being sent to the cloud-based service.

In some examples, the processing resource, the memory resource, or both can learn about the task and the environment of the task and update the machine learning model via a cloud-based service, a local area network, or a combination thereof. For instance, updating can occur in the cloud (e.g., with encryption in place), locally (e.g., among robots within a local area network), or both. For instance, a delivery robot may be in communication with other delivery robots at a charging location. While charging, the robots may exchange data and machine learning models can be retrained locally using the shared data. The data may also be sent to a cloud-based service, in some examples, for further retraining of machine learning models.

Figure 2:
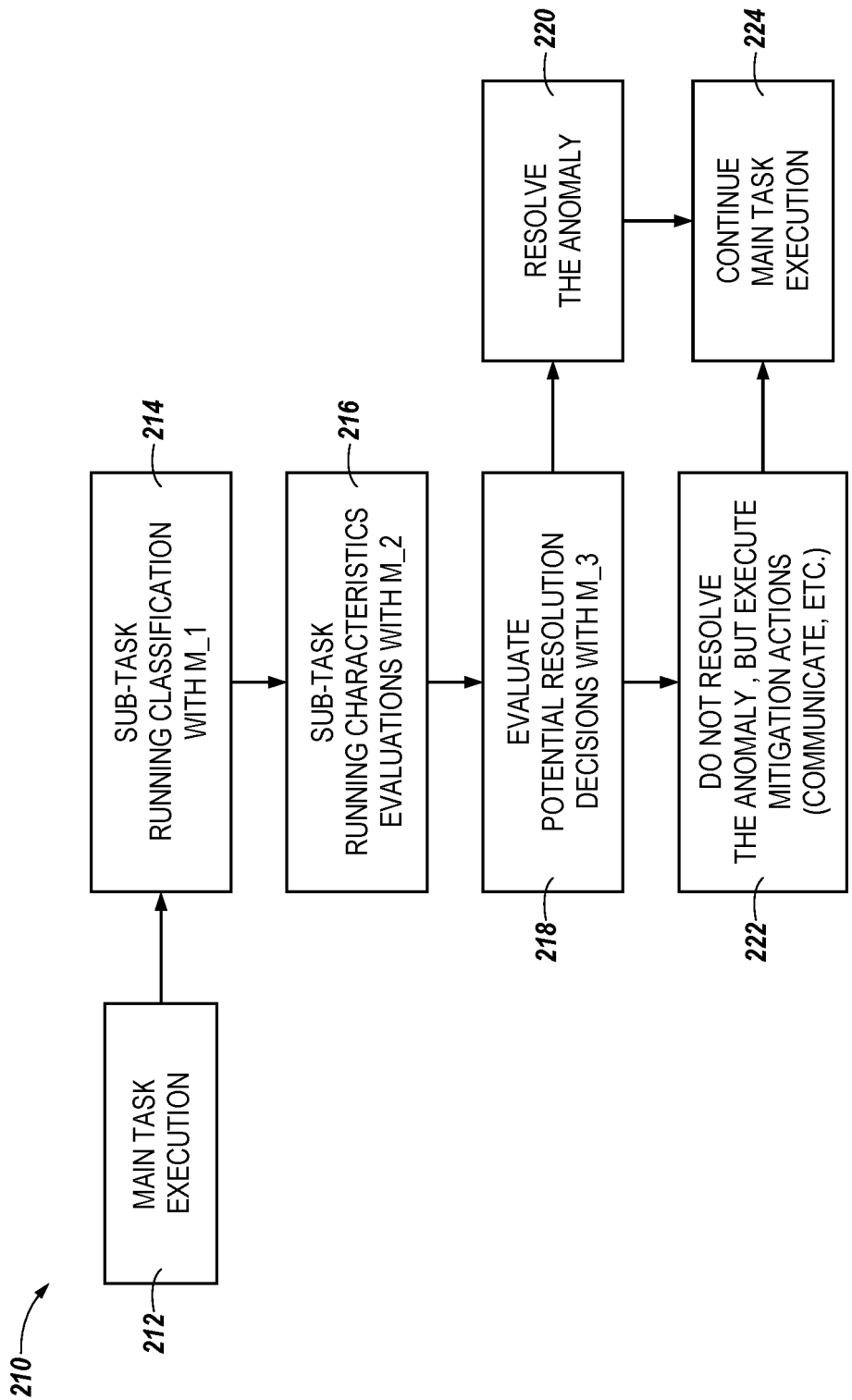
FIG. 2 is another flow diagram representing an example method for anomaly detection and resolution in accordance with a number of embodiments of the present disclosure.

FIG. 2 is another flow diagram representing an example method 210 for anomaly detection and resolution in accordance with a number of embodiments of the present disclosure. The method 210 illustrates deployment of machine learning models associated with the robot locally, at a cloud-based service, or a combination thereof. For instance, the robot executes its main task at 212 (e.g., cleaning, delivery, etc.). At 214, a machine learning model, M_1, is run as a subtask and classifies objects and environments identified during the main task as anomalies/anomalous or non-anomalies/non-anomalous. This can occur while the robot is at a charging station or while the robot is performing the main task.

At 216, a machine learning model, M_2, is run as a subtask if the object and/or environment is determined to be an anomaly. For instance, M_2 can be used to analyze and compare characteristics of the object and/or environment and compare to previously encountered objects and/or environments, as well as data on which M_2 was trained to determine a resolution to the anomaly. This can confirm whether or not the object and/or environment is anomalous and what type of anomaly the object and/or environment is. If neither the object nor the environment is determined to be anomalous per M_1, M_2 is not run, which reduces power consumption by the robot.

At 218, the method 210 can include determining if it is possible to resolve the anomalous object and/or environment and how to do so. In some instances, a plurality of potential resolutions may be determined, and using machine learning model M_3, a decision can be made regarding resolution of the anomalous object and/or environment. A determination can be made to resolve the anomaly at 220. For instance, if the robot comes across an open door, resolution options may include going around the door or closing the door. Using M_3, a determination can be made to close the door with the robot's own force.

Alternatively, at 222, a determination can be made not to resolve the anomaly but to instead execute mitigation actions. For instance, rather than the robot closing the door under its own powers, the robot can communicate that the door is open, so that a user can find the open door and close it. In some instance, mitigation actions may be considered resolution of the anomaly.

At 224, the robot can continue to execute the main task. This can occur whether no anomaly was detected, an anomaly was detected and resolved, or an anomaly was detected, and mitigation actions were executed.

Figure 3:
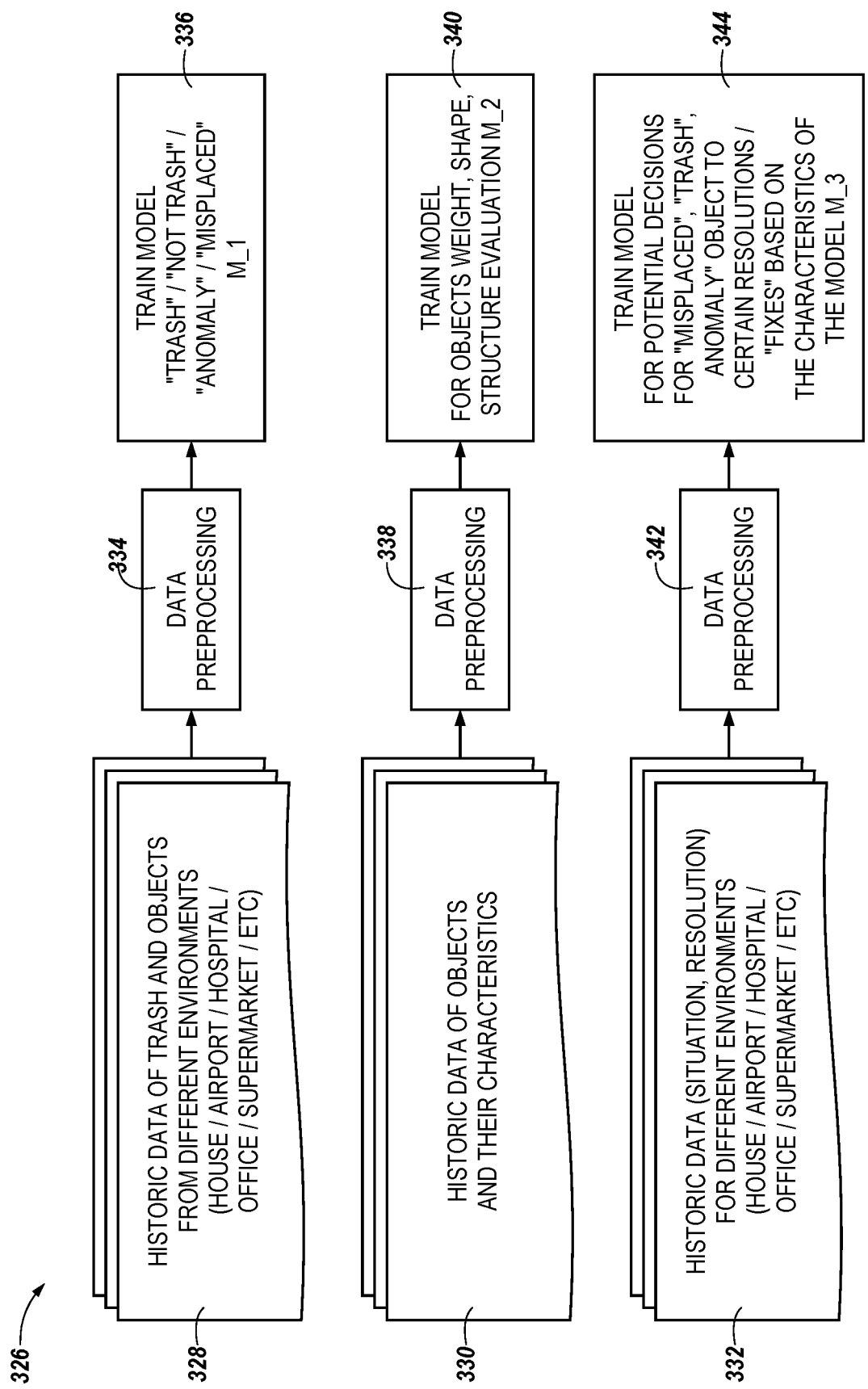
FIG. 3 is yet another flow diagram representing an example method for anomaly detection and resolution in accordance with a number of embodiments of the present disclosure.

FIG. 3 is yet another flow diagram representing an example method 326 for anomaly detection and resolution in accordance with a number of embodiments of the present disclosure. The method 326 includes training processes for the machine learning models M_1, M_2, and M_3. The example illustrated in FIG. 3 relates to a cleaning robot, but examples are not limited to cleaning robots and can include other mobile robots such as delivery robots.

At 328, historical data associated with the robot and/or previous objects and/or environments associated with the robot are collected (e.g., via image sensors), and the data is processed at 334. At 336, the machine learning model M_1 is trained to make determinations regarding anomalies, non-anomalies (e.g., trash, misplaced objects, items that are neither trash nor anomalies). For instance, a cleaning robot in a hospital may benefit from historical data collected by other robots, and this data may be used to train M_1, along with data gathered by the cleaning robot each time it cleans the hospital. The gathered data can be processed and used to augment M_1.

At 330, historical data associated with objects and/or environments and their characteristics (e.g., weight, size, color, shape, structure, temperature, etc.) can be gathered (e.g., via image sensors, pressure sensors, weather sensors, etc.). The data, along with data gathered by the robot during its primary task, can be processed at 338 and the machine learning model M_2 can be trained at 340. At 332, historical data associated with anomaly resolution for different objects and/or environments (e.g., how a particular anomaly was previously resolved) can be gathered. The data can be processed at 342 and the machine learning model M_3 can be trained for potential decisions to be made based on the object and/or environment classification and the characteristics of the object and/or environment. For instance, M_3 can be used to determine if the robot has a resolution for a particular anomaly, or if the robot needs to communicate with a user to request a resolution.

The training of the machine learning models M_1, M_2, and M_3 can be performed while the robot is charging, in some example, to preserve battery life of the robot and increase security. For instance, training while the robot is performing its main task may reduce battery life and performance. In addition, training while the robot is performing its main task may make personal data susceptible to hacking because the data is sent over a network. In some examples, with secure encryption, training may be performed via a cloud-based service.

Figure 4:
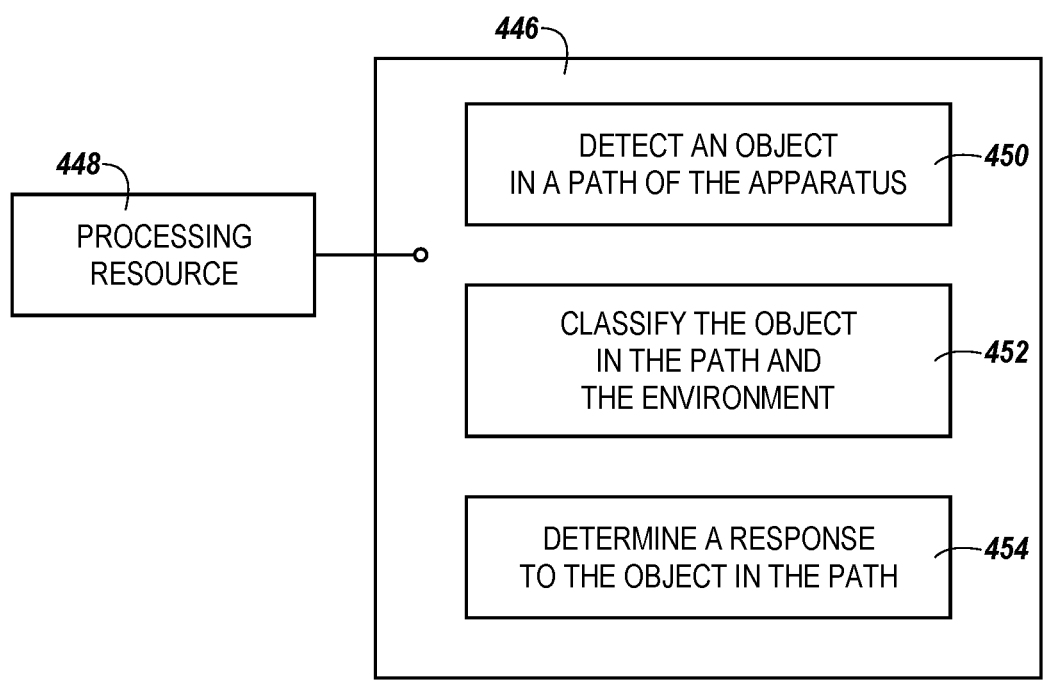
FIG. 4 is a functional diagram representing a processing resource in communication with a memory resource having instructions written thereon in accordance with a number of embodiments of the present disclosure.

FIG. 4 is a functional diagram representing a processing resource 448 in communication with a memory resource 446 having instructions 450, 452, 454 written thereon in accordance with a number of embodiments of the present disclosure. The apparatus illustrated in FIG. 4 can be a server or a computing device (e.g., a robot or a portion of a robot) and can include the processing resource 448. The apparatus can further include the memory resource 446 (e.g., a non-transitory MRM), on which may be stored instructions, such as instructions 450, 452, 454. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 446 may be electronic, magnetic, optical, or other physical storage device that stores executable instructions. Thus, the memory resource 446 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 446 is a non-transitory MRM comprising Random Access Memory (RAM), an Electrically-Erasable Programmable ROM (EEPROM), a storage drive, an optical disc, and the like. The memory resource 446 may be disposed within a controller and/or computing device. In this example, the executable instructions 450, 452, 454 can be "installed" on the device. Additionally and/or alternatively, the memory resource 446 can be a portable, external or remote storage medium, for example, that allows the system to download the instructions 450, 452, 454 from the portable/external/remote storage medium. In this situation, the executable instructions may be part of an "installation package". As described herein, the memory resource 446 can be encoded with executable instructions for anomaly detection and resolution in an environment (e.g., of a robot).

The instructions 450, when executed by a processing resource such as the processing resource 448, can detect, via a sensor of the apparatus, an object in a path of the apparatus while the apparatus is performing a cleaning task in an environment. For instance, a robot may detect dirt, an open door, a moving object, a person, a pet, other robots, a piece of paper, a bead, etc. in a home in which it is performing its task. While a home is used as an example environment in this example, other environments may include a hospital, restaurant, supermarket, airport, warehouse, store, street/road/parking lot, office, etc. The sensor, for instance, can include an image sensor (e.g., a camera), a pressure sensor, or a combination thereof, among other sensors.

The instructions 452, when executed by a processing resource such as the processing resource 448, can classify the object in the path of the apparatus as an anomaly or a non-anomaly and the environment as anomalous or non-anomalous using a machine learning model based on historical data associated with an object previously detected by the sensor, including, for instance historical data of physical characteristics, environmental characteristics (e.g., biodegradable vs. non-biodegradable), or a combination thereof associated with the object previously detected by the sensor. For example, the robot may detect an open door using the machine learning model that has been trained using data that included historical characteristic data associated with the open door or an open door with similar characteristics. As a result, the open door can be classified as an anomaly. Similar, the robot can detect the piece of paper and classify it as a non-anomaly (e.g., trash) if it is under a particular size or includes few colors using the machine learning model. In contrast, the piece of paper may be classified as an anomaly or unknown if it is larger than a particular size or very colorful. Such characteristics, as learned by the machine learning model, may indicate a child's artwork or other paperwork.

In some instances, the object in the path can be classified using the machine learning model based on a combination of the historical data associated with the object previously detected by the sensor, historical data of physical characteristics associated with the object previously detected by the sensor, and received user input associated with classification of the object in the path of the apparatus and the environment, classification of the object previously detected by the sensor and the environment, or both. For instance, if the object in the path is determined to be a bead, the combination of historical data associated with the object, physical characteristics, environmental characteristics, and user input may result in a classification of an anomaly because the object is not trash (e.g., a child's bead collection), but is instead a misplaced item that should not be cleaned by the cleaning robot.

The instructions 454, when executed by a processing resource such as the processing resource 448, can determine a response to the object in the path of the apparatus based on the classification and the machine learning model based on historical resolution data associated with the object previously detected by the sensor. For instance, if the detected object is an open door classified as an anomaly, the robot may respond by closing the door using its own power based on successful historical resolutions in which the robot closed the door.

In some instances, determining the response to the object in the path can include using the machine learning model based on a combination of the classification of the object in the path of apparatus, the historical resolution data associated with the object previously detected by the sensor, and received user input associated with resolution of the object in the path of the apparatus, and resolution of the object previously detected by the sensor, or both. For instance, in the bead example, the robot may determine the response is to move the bead to a particular location where misplaced items are stored based on the combination.

In some examples, the instructions 454 can be executable to remove the object in the path of the apparatus and proceed with the cleaning task responsive to classification of the object in the path of the apparatus as a non-anomaly and the environment as non-anomalous and resolve the anomaly or the anomalous environment and proceed with the cleaning task responsive to classification of the object in the path of the apparatus as an anomaly or the environment as anomalous. For instance, dirt may be classified as non-anomalous. In such an example, the robot can proceed with its task and clean the dirt. In the open-door example, the robot can resolve the anomaly by closing the door using its own power.

Resolving the anomaly, in some instances, can include instructing the apparatus to move the object in the path of the apparatus to a different location, instructing a different apparatus to move the object in the path of the apparatus to the different location, or a combination thereof. For instance, in the bead example, the robot can move the bead to the particular location or instruct a different apparatus to move the bead. In a warehouse example, a box that has fallen off a shelf (and classified as anomalous) may be too large for the robot to move. In such an example, the robot can instruct a stronger robot to move the box.

In some examples, the apparatus can include instructions executable to receive, from the sensor, data about the cleaning task and the environment while the robot is performing the cleaning task, learn about the cleaning task and the environment via the machine learning model and based on the received data, and update the machine learning model based on the received data, the historical data associated with the object previously detected by the sensor, the historical resolution data associated with the object previously detected by the sensor, user input associated with the cleaning task, or a combination thereof. For example, if the robot is cleaning the house and detects an addition to the environment (e.g., a room added to the house) or a new object (e.g., a new lamp), it can collect the new data and use it to train an associated machine learning model when it returns to its charging station. When new elements are detected, they may be classified as anomalous until a decision is made otherwise. In such examples, a user may instruct the robot how to handle the new environmental element or new object, which can aid in training the machine learning model.

Figure 5:
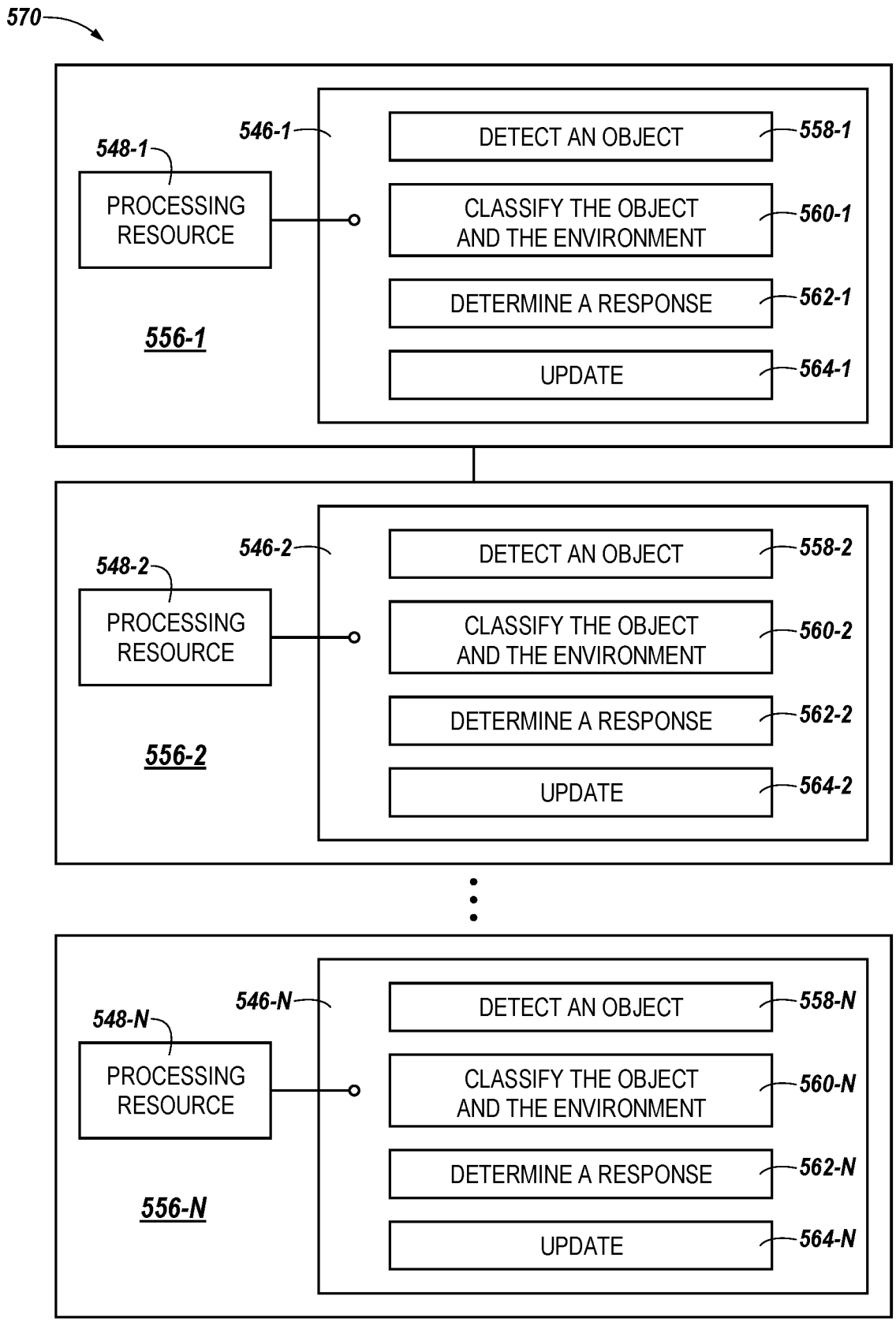
FIG. 5 is a functional block diagram in the form of a system including a plurality of processing resources in communication with a plurality of memory resources having instructions written thereon in accordance with a number of embodiments of the present disclosure.

FIG. 5 is a functional block diagram in the form of a system 570 including a plurality of processing resources 548-1, 548-2, . . . , 548-N in communication with a plurality of memory resources 546-1, 546-2, . . . , 546-N having instructions 558, 560, 562 written thereon in accordance with a number of embodiments of the present disclosure.

For instance, FIG. 5 can include a system 570 including a plurality of delivery robots 556-1, 556-2, . . . , 556-N communicatively coupled to one another. "Communicatively coupled," as used herein, can include coupled via various wired and/or wireless connections between devices such that data can be transferred in various directions between the devices. The coupling may not be a direct connection, and in some examples can be an indirect connection. Each one of the plurality of delivery robots 556 can include sensors such as, for instance, an image sensor, a motion sensor, a light sensor, an accelerometer, a noise sensor, a camera device, a temperature sensor, a proximity sensor (e.g., a distance sensor, a range sensor), a radar sensor, a lidar sensor, a localization sensor, a weather sensor, a pressure sensor, a tilt sensor, a humidity sensor, a smoke, gas, and alcohol sensor, or a combination thereof. Other sensors may be also be included. Each one of the plurality of delivery robots 556 may have the same sensors, different sensors, or a combination thereof.

Each one of the plurality of delivery robots 556 can include a processing resource 548 and a memory resource 546 in communication with the processing resource 548 and having instructions executable to detect, via a sensor, an object in a path of the delivery robot 556 while the delivery robot 556 is performing a delivery task in an environment (e.g., instructions 558-1, 558-2, . . . , 558-N). For instance, a delivery robot 556 such as a drone or package-delivery robot may encounter a hole in the ground, a tree, a dog, or some other object/person/animal in its path. In addition, the delivery robot 556 can detect environmental elements such as weather or traffic.

In some examples, the memory resources 546 can include instructions executable to classify the object as an anomaly or a non-anomaly and the environment as anomalous or non-anomalous using a machine learning model based on historical data associated with an object previously detected by the sensor and historical data received from other delivery robots of the plurality of delivery robots 556 (e.g., instructions 560-1, 560-2, . . . , 560-N). For instance, a tree or a hole may not be an anomaly, but rather something the delivery robot 556 moves around. In contrast, an anomaly or anomalous environment may be a threat to delivery of the delivery robot's 556 cargo, a safety threat to the delivery robot, or a combination thereof. For instance, an anomaly may include an aggressive dog or a package thief, and an anomalous environment may include a tornado or flash flood.

In some instances, the memory resources 546 can include instructions executable to determine a response to the object based on the classification and the machine learning model based on resolution data associated with the object previously detected by the sensor in the environment and historical data received from other delivery robots of the plurality of delivery robots 556 (e.g., instructions 562-1, 562-2, . . . , 562-N). The response can include instructions executable, for instance, to proceed with the delivery task responsive to classification of the object in the path of the delivery robot 556 as a non-anomaly and the environment as non-anomalous, resolve the anomaly or the environment responsive to classification of the object in the path of the delivery robot 556 as an anomaly or the environment as anomalous, and update the machine learning model based on the classification and determined response. Resolving the anomaly, in some instances, can include instructing the delivery robot to stop delivery of the delivery robot's 556 cargo, reporting the anomaly to an administrator, capturing an image of the anomaly, instructing a different apparatus to address the anomaly, or a combination thereof.

For instance, if the delivery robot 556 encounters an aggressive dog, using the machine learning model, it may be determined that a response include moving to a safer location, engaging protective armor, or deploying a protective robot. In an example wherein the anomaly includes a potential package thief, the delivery robot 556 respond similarly, but may also capture an image of the package thief for use in an investigation, if necessary. In an example where the environment is anomalous (e.g., tornado, flash flood), the delivery robot 556 may resolve the anomaly by returning to its charging station if it can do so safely or finding a safer location. Alerts may be sent to administrators in such examples, indicating the anomalous situations.

In some examples, the machine learning model can be updated while the delivery robot (e.g., delivery robot 556-1) and at least one other delivery robot (e.g., delivery robot 556-2) of the plurality of delivery robots 556 is coupled to a charging station and connected to a local network. For example, upon completion of a delivery task, the delivery robot 556-1 may return to its charging station and connect to the local network. The delivery robot 556-2 may be at its charging station and connected to the location network. The charging stations, for instance, may be in a charging area of a warehouse. The delivery robots 556 can share data they received in their recent deliveries with other delivery robots 556 over the local network, and respective machine learning models can be updated accordingly. This can preserve security while increasing effectiveness of the delivery robots by increasing the data used to train associated machine learning models. In some examples, updating can be performed via a cloud-based service with data encryption.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   detecting at a processing resource and via a sensor of a robot, an object in a path of the robot while the robot is performing a task in an environment;
   classifying at the processing resource the object as an anomaly or a non-anomaly and the environment as anomalous or non-anomalous using a first machine learning model;
   responsive to the processing resource's classification of the object as an anomaly or the environment as anomalous using the first machine learning model, utilizing a second machine learning model to confirm whether or not the object or the environment is anomalous and what type of anomaly the object or the environment is;
   proceeding with the task responsive to the processing resource's classification and confirmation of the object as a non-anomaly and the environment as non-anomalous;
   determining a plurality of potential resolutions to the anomaly or the anomalous environment responsive to the processing resource's classification and confirmation of the object as an anomaly or the environment as anomalous;
   selecting one of the plurality of potential resolutions utilizing a third machine learning model;
   resolving the anomaly or the anomalous environment utilizing the selected potential resolution before proceeding with the task;
   detecting a new object or an addition to the environment;
   classifying the new object or the addition to the environment as an anomaly until a decision is made otherwise based on receipt of user instructions;
   collecting data associated with the new object or the addition to the environment; and
   training the first machine learning model based on the collected data and the user instructions.

2. The method of claim 1, further comprising:
   receiving at the processing resource, from the sensor, data about the task and the environment of the task while the robot is performing the task;
   the processing resource, a memory resource coupled to the processing resource, or both, of the robot learning about the task and the environment of the task via the first machine learning model based on the received data; and the processing resource, the memory resource, or both updating the first machine learning model based on the received data and data previously received from the sensor during previous task performances.

3. The method of claim 2, wherein classifying the object as an anomaly or the environment as anomalous comprises determining, using the first machine learning model, the object or the environment deviates from an object normally detected in the path or an environment normally associated with the task based on the received data and the previously received data.

4. The method of claim 2, further comprising the processing resource, the memory resource, or both:
receiving the first machine learning model from a cloud-based service;
augmenting the first machine learning model with data collected while performing the task; and
updating the first machine learning model while the robot is coupled to a charging station with collected data.

5. The method of claim 2, further comprising the processing resource, the memory resource, or both learning about the task and the environment of the task and updating the first machine learning model via a cloud-based service, a local area network, or a combination thereof.

6. The method of claim 1, wherein detecting the object in the path comprises detecting the object in the path of the robot while the robot is performing a cleaning task in the environment.

7. The method of claim 1, wherein detecting the object in the path comprises detecting the object in the path of the robot while the robot is performing a delivery task in the environment.

8. The method of claim 1, wherein resolving the anomaly or the anomalous environment comprises the processing resource, a memory resource coupled to the processing resource, or both instructing the robot to move the object to a different location.

9. The method of claim 1, wherein resolving the anomaly or the anomalous environment comprises the processing resource, a memory resource coupled to the processing resource, or both communicating to a processing resource of a different robot to move the object to a different location.

10. An apparatus, comprising:
a processing resource; and
a memory resource in communication with the processing resource having instructions executable to:
detect, via a sensor of the apparatus, an object in a path of the apparatus while the apparatus is performing a cleaning task in an environment;
classify the object in the path of the apparatus as an anomaly or a non-anomaly and the environment as anomalous or non-anomalous using a first machine learning model based on historical data associated with an object previously detected by the sensor;
responsive to the classification of the object as an anomaly or the environment as anomalous using the first machine learning model, utilize a second machine learning model to confirm whether or not the object or the environment is anomalous and what type of anomaly the object or the environment is; and
determine a response to the object in the path of the apparatus based on the classification, confirmation, and the first and the second machine learning model based on historical resolution data associated with the object previously detected by the sensor, wherein the response comprises instructions executable to:
remove the object in the path of the apparatus and proceed with the cleaning task responsive to classification of the object in the path of the apparatus as a non-anomaly and the environment as non-anomalous;
determine a plurality of potential resolutions to the anomaly or the anomalous environment responsive to classification and confirmation of the object in the path of the apparatus as an anomaly or the environment as anomalous;
select one of the plurality of potential resolutions utilizing a third machine learning model;
resolve the anomaly or the anomalous environment utilizing the selected potential resolution before proceeding with the task;
detect a new object or an addition to the environment;
classify the new object or the addition to the environment as an anomaly until a decision is made otherwise based on receipt of user instructions;
collect data associated with the new object or the addition to the environment; and
train the first machine learning model based on the collected data and the user instructions.

11. The apparatus of claim 10, further comprising the instructions executable to classify the object based on historical data of physical characteristics, environmental characteristics, or a combination thereof associated with the object previously detected by the sensor.

12. The apparatus of claim 10, wherein the instructions executable to resolve the anomaly or the anomalous environment utilizing the selected potential resolution comprise instructions executable to:
instruct the apparatus to move the object in the path of the apparatus to a different location;
instruct a different apparatus to move the object in the path of the apparatus to the different location; or
a combination thereof.

13. The apparatus of claim 10, further comprising the instructions executable to classify the object in the path of the apparatus using the first machine learning model based on a combination of:
the historical data associated with the object previously detected by the sensor;
historical data of physical characteristics associated with the object previously detected by the sensor; and
received user input associated with classification of the object in the path of the apparatus and the environment, classification of the object previously detected by the sensor and the environment, or both.

14. The apparatus of claim 10, further comprising the instructions executable to determine the response to the object in the path of the apparatus using the first machine learning model based on a combination of:
the classification of the object in the path of apparatus;
the historical resolution data associated with the object previously detected by the sensor; and
received user input associated with resolution of the object in the path of the apparatus, and resolution of the object previously detected by the sensor, or both.

15. The apparatus of claim 10, further comprising the instructions executable to:
receive, from the sensor, data about the cleaning task and the environment while the apparatus is performing the cleaning task;

learn about the cleaning task and the environment via the first machine learning model and based on the received data; and update the first machine learning model based on the received data, the historical data associated with the object previously detected by the sensor, the historical resolution data associated with the object previously detected by the sensor, user input associated with the cleaning task, or a combination thereof.

16. A system, comprising:

a plurality of delivery robots communicatively coupled to one another, wherein each one of the plurality of delivery robots comprises:

a processing resource; and a memory resource in communication with the processing resource having instructions executable to:

detect, via a sensor, an object in a path of the delivery robot while the delivery robot is performing a delivery task in an environment;

classify the object as an anomaly or a non-anomaly and the environment as anomalous or non-anomalous using a first machine learning model based on historical data associated with an object previously detected by the sensor and historical data received from other delivery robots of the plurality of delivery robots;

responsive to the classification of the object as an anomaly or the environment as anomalous using the first machine learning model, utilize a second machine learning model to confirm whether or not the object or the environment is anomalous, what type of anomaly the object or the environment is, and a plurality of potential resolutions to the anomaly or the anomalous environment;

utilizing a third machine learning model, select one of the plurality of potential resolutions as a response to the object based on the classification, the confirmation, and resolution data associated with the object previously detected by the sensor in the environment and historical data received from other delivery robots of the plurality of delivery robots, wherein the response comprises instructions executable to:

proceed with the delivery task responsive to classification and confirmation of the object in the path of the delivery robot as a non-anomaly and the environment as non-anomalous;

resolve the anomaly or the environment utilizing the selected potential resolution before proceeding with the delivery task responsive to classification and confirmation of the object in the path of the delivery robot as an anomaly or the environment as anomalous;

update the first machine learning model and the second machine learning model based on the classification, confirmation, and determined response;

detect a new object or an addition to the environment;

classify the new object or the addition to the environment as an anomaly until a decision is made otherwise based on receipt of user instructions;

collect data associated with the new object or the addition to the environment; and train the first machine learning model based on the collected data and the user instructions.

17. The system of claim 16, wherein the instructions are executable to update the first machine learning model while the delivery robot and at least one other delivery robot of the plurality of delivery robots is coupled to a charging station and connected to a local network.

18. The system of claim 16, wherein the sensor comprises at least two of: an image sensor, a motion sensor, a light sensor, an accelerometer, a noise sensor, a camera device, a temperature sensor, a proximity sensor, a radar sensor, a lidar sensor, a weather sensor, a pressure sensor, a tilt sensor, a humidity sensor, a localization sensor, and a smoke, gas, and alcohol sensor.

19. The system of claim 16, wherein the anomaly or the anomalous environment comprises a threat to delivery of the delivery robot's cargo, a safety threat to the delivery robot, or a combination thereof.

20. The system of claim 16, wherein the instructions executable to resolve the anomaly utilizing the selected potential resolution comprise instructions executable to:

instruct the delivery robot to stop delivery of the delivery robot's cargo;

report the anomaly to an administrator;

capture an image of the anomaly;

instruct a different apparatus to address the anomaly; or a combination thereof.

\* \* \* \* \*